(12) United States Patent
Brown et al.

(10) Patent No.: US 6,679,667 B2
(45) Date of Patent: Jan. 20, 2004

(54) HOT MELT FASTENER FILLER

(75) Inventors: Mark D. Brown, San Pedro, CA (US); Susan LaColla Wade, Westminster, CA (US); John W. Tully, Rolling Hills Estates, CA (US); George V. Case, Gardena, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 305 days.

(21) Appl. No.: 09/795,753

(22) Filed: Feb. 28, 2001

(65) Prior Publication Data

US 2002/0119028 A1 Aug. 29, 2002

(51) Int. Cl.[7] .............................. H05F 1/02; A47G 3/00
(52) U.S. Cl. ...................................... 411/377; 364/218
(58) Field of Search .......................... 411/372.5, 372.6, 411/373, 377, 82; 361/218; 244/1 A

(56) References Cited

U.S. PATENT DOCUMENTS

| | | | |
|---|---|---|---|
| 3,230,817 A | * 1/1966 | Thomas | |
| 4,085,186 A | 4/1978 | Rainer | .......................... 264/268 |
| 4,479,163 A | * 10/1984 | Bannink | |
| 4,502,092 A | * 2/1985 | Bannink | |
| 4,522,889 A | * 6/1985 | Ebneth | |
| 4,551,189 A | 11/1985 | Peterson | .................... 156/73.5 |
| 4,556,591 A | 12/1985 | Bannink, Jr. | ................. 428/43 |
| 4,628,402 A | * 12/1986 | Covey | |
| 4,630,168 A | * 12/1986 | Hunt | |
| 4,681,497 A | * 7/1987 | Berecz | |
| D295,017 S | 4/1988 | Evenson | ...................... D8/107 |
| 4,884,929 A | * 12/1989 | Smith | |
| 5,065,960 A | 11/1991 | Castellucci | .................. 244/131 |
| 5,391,028 A | 2/1995 | Charles | ........................ 411/374 |
| 5,593,120 A | 1/1997 | Haamerski | ............... 248/205.3 |
| 5,695,154 A | 12/1997 | Castelluccii | ................. 244/130 |
| 5,705,795 A | 1/1998 | Anderson | .................... 219/633 |
| 5,781,412 A | 7/1998 | de Sorgo | .................... 361/704 |
| 5,845,872 A | * 12/1998 | Pridham | |

* cited by examiner

Primary Examiner—Flemming Saether
(74) Attorney, Agent, or Firm—Stetina Brunda Garred & Brucker

(57) ABSTRACT

A hot-melt fastener filler placeable within a void atop an in-place fastener countersunk within a surface such as an exposed aircraft surface. The filler includes an electrically-conductive mat fabricated of at least one ply having a plurality of non-woven electrically conductive fibers each having a core strand coated with a nickel layer, preferably coated with two additional layers of copper and nickel, and generally uniformly dispersed within a thermoplastic elastomer. Electrically conductive carbon black particulate can be distributed throughout the elastomer, and the mat preferably is fabricated of two plies oriented at 0° and 90° to each other. A pressure sensitive adhesive can be provided on one side of the sheet to thereby permit secured placement prior to completion of installation. The fastener filler allows not only regularly scheduled maintenance, but also permits quick and generally uncomplicated field-level repairs for assuring equipment availability at remote sites.

16 Claims, 1 Drawing Sheet

HOT MELT FASTENER FILLER

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates in general to fillers for placement over countersunk fasteners disposed in surface openings, and in particular to a hot-melt fastener filler fabricated as a sheet of a non-woven electrically conductive mat impregnated within a thermoplastic elastomer and sizable to fit atop an in-place fastener.

A typical manner of fastening one structural component to another is to employ standard bolts and nuts which are countersunk within voids of the surfaces of the components being joined. Once the fasteners are properly tightened, the countersink voids are filled with a fastener filler to thereby produce a generally smooth surface as nut and bolt ends are covered.

One particularly important application where such a filler is used in the construction and maintenance of aircraft where surface characteristics must be substantially compatible over entire expanses. Present fillers typically are dielectric fillers having relatively long cure times, and, upon curing, are prone to be brittle which results in premature cracking thereof to produce cracks leading to the conductive layer of the filler. A large number of such cracks can easily lead to untoward surface behavior. Additionally, because of the long cure times associated with aircraft repairs, non-availability of such airplanes under repair along with associated costs significantly reduces operation efficiency.

In view of the above deficiencies in current filler material, it is apparent that a need is present for a fastener filler whose application procedures and longevity of use are beneficial in aircraft construction and repair. Accordingly, a primary object of the present invention is to provide an electrically smooth fastener filler that can be applied and cured within seconds within a countersink hole which houses a fastener end.

Another object of the present invention is to provide such a fastener filler in sheet form and easily sizable to fit within a countersink void in the surface.

Yet another object of the present invention is to provide such a filler fastener wherein one side of the sheet is provided with a pressure sensitive adhesive for initial secured placement against the fastener end prior to filler curing.

These and other objects of the present invention will become apparent throughout the description thereof which now follows.

BRIEF SUMMARY OF THE INVENTION

The present invention is a hot-melt fastener filler for placement within a void atop an in-place fastener which is countersunk within a surface, with the filler comprising an electrically-conductive mat fabricated of at least one ply sizable by cutting to a cross-sectional dimension of the void. The at least one ply comprises a plurality of non-woven electrically conductive fibers each comprising a core strand coated with a layer of nickel, with the plurality of fibers generally uniformly dispersed within a thermoplastic elastomer. Preferably, electrically conductive carbon black particulate is substantially uniformly distributed throughout the thermoplastic elastomer, and the electrically conductive mat is fabricated of two such plies oriented at 0° and 90° to each other. The electrically conductive nickel-coated fibers additionally can be coated with a layer of copper layer followed by a second layer of nickel. A pressure sensitive adhesive can be provided on one side of the sheet to thereby permit secured placement, such as in an overhead application, prior to completion of installation.

Placement of the fastener filler within the void atop the fastener is easily and rapidly accomplished. Preferably, the fastener filler is provided as a large sheet from which is punched a portion equal cross-sectionally to the cross sectional dimension, usually circular, of the void. When adhesive is supplied to one side of the sheet, a release layer typically is provided for ease of handling. Once the properly sized piece is cut, the release layer is removed and the filler is placed within the void such that the adhesive abuts the exposed end of the fastener there within and finger pressure is applied for the adhesive to engage the fastener end. A non-porous cover patch is then positioned over the filler and heat is applied, as with an iron, on the patch to thereby cause the elastomer of the filler to flow and complete filler set. Usual time involved is generally less than one minute, as opposed to hours required for curing prior art fillers. As a result, the fastener filler of the present invention allows not only regularly scheduled maintenance and repairs, but also permits quick and generally uncomplicated field-level repairs for assuring aircraft availability at remote sites.

BRIEF DESCRIPTION OF THE DRAWINGS

An illustrative and presently preferred embodiment of the invention is shown in the accompanying drawings in which.

DETAILED DESCRIPTION OF THE PREFERRED EMBODIMENT

Figure 1:
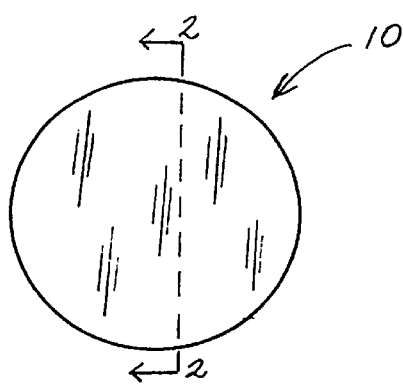
FIG. 1 is a top plan view of a fastener filler of the present invention in the configuration of a circle.
Figure 2:
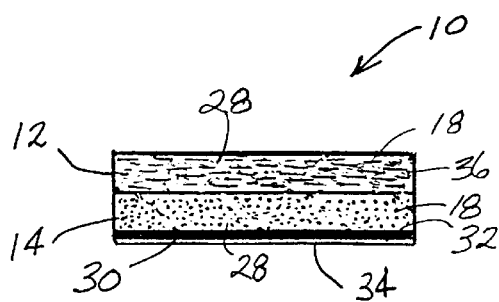
FIG. 2 is a side elevation view in section along line 2—2 of FIG. 1.
Figure 3:
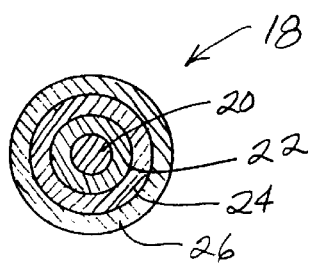
FIG. 3 is an exploded view of one fiber of the filler.

Referring first to FIGS. 1 and 2, a hot-melt fastener filler 10 is shown. The filler 10 is constructed of two plies 12, 14 oriented at 0° and 90° to each other to form an electrically-conductive mat 16. Each ply 12, 14 is fabricated of a plurality of non-woven electrically conductive fibers 18 whose construction is clearly illustrated in FIG. 3. Specifically, each said fiber 18 is a core strand of graphite 20 coated with a nickel layer 22, a copper layer 24, and a second nickel layer 26, and are generally uniformly dispersed within a thermoplastic elastomer 28 non-limitedly exemplified by polyvinylchloride which has electrically conductive carbon black particulate 36 distributed throughout. A standard pressure-sensitive adhesive 30 is provided on one side of the 32 of the filler 10 and a release liner 34 covers the adhesive 30 for ease of product handling until adhesive properties are needed.

The manufacture of a ply 12, 14 is initiated by loading the polyvinylchloride elastomer 28 with the carbon black particulate 36 (produced by Cabot Corp., Billerca, Mass., catalog reference XC-72R). This particulate-loaded elastomer then is impregnated into a nickel-copper-nickel coated-graphite fiber non-woven mat (produced by Technical Fiber Products, Slate Hill, N.Y.) and cured to thereby form a ply 12, 14. The fibers (produced by Composite Materials, LLC, Manaroneck, N.Y.) of the non-woven mat are chopped and are retained generally unidirectionally with a polyester binder. Placement of the adhesive 30 (produced by Adchem Corp., Westbury, N.Y., catalog reference 730 or 728) is accomplished by applying it along one exposed side 32 of a ply 12, 14.

Figure 4:
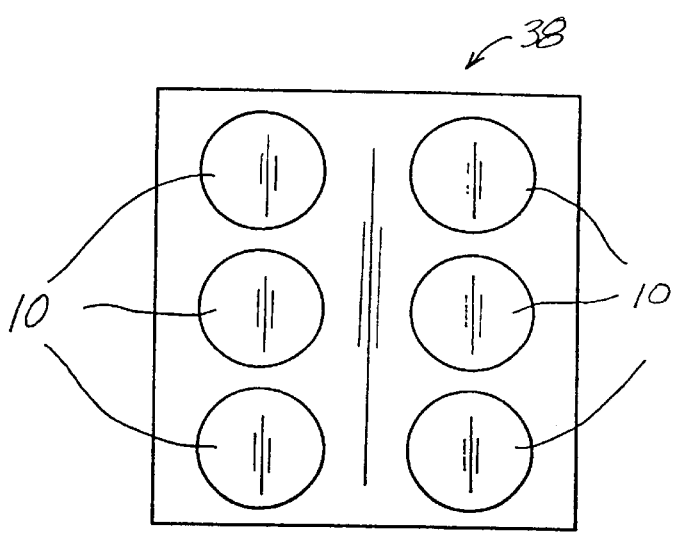
FIG. 4 is a top plan view of a plurality of fastener fillers as supplied and cut from a single large sheet.
Figure 5:
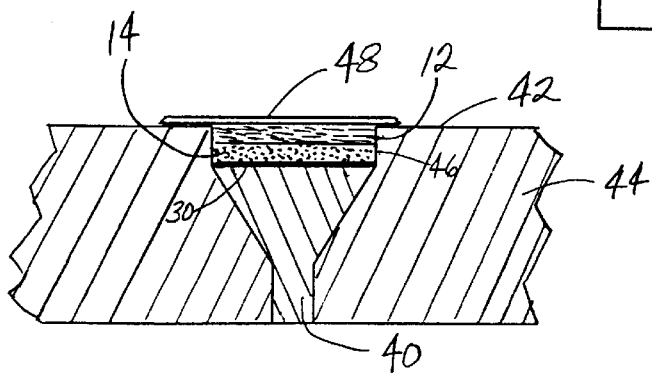
FIG. 5 is a side elevation view in section of the fastener filler of FIG. 1 in place as a filler in a portion of an aircraft structure.

FIG. 4 illustrates a preferred manufacturing approach wherein a large sheet 38 is fabricated as the filler and from which filler sizes ("fill dots") as needed are cut as with a punch from the sheet 38 for subsequent use. Such use is illustrated in FIG. 5 wherein a standard fastener 40 is countersunk within a surface 42 of a structure 44 such as an aircraft structure to form atop the fastener 40 a void 46 which is filled by the filler 10 upon removal of the release liner 34 and finger pressure to enhance adhesive contact of the adhesive 30 with the fastener 40. Once the filler 10 is so positioned, a patch 48 fabricated of a non-porous glass cloth impregnated with TEFLON (produced by Taconic Co., Santa Maria, Calif. under ARMALON trademark) is positioned over the now-filled void 46 and heat as with an electric iron (not shown) is applied on top of the patch 48 to thereby melt the thermoplastic elastomer 28 for flow within the void 46 and to adhere the patch 48 in place. A typical completion time for such curing is about 30 seconds.

As is thus apparent, immediate and rapid repair can be achieved in providing a fastener filler as for aircraft maintenance without requiring a large time commitment during which period use operations must cease. While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A hot-melt fastener filler for placement within a void atop an in-place fastener which is countersunk within a surface, the filler comprising an electrically-conductive mat fabricated of at least one ply sizeably by cutting to a cross-sectional dimension of the void, said at least one ply comprising a heat-conducting patch disposed thereover and a plurality of non-woven electrically conductive fibers each comprising a core strand coated with a layer of nickel, with said plurality of fibers generally uniformly dispersed within a thermoplastic elastomer, wherein the patch is adapted to contain the elastomer within the void while further being adapted to conduct heat beyond a melting point of the elastomer therethrough to melt the elastomer during cure to prevent any of the cured elastomer from protruding outside thereof to thereby form a substantially continuous surface.

2. A hot-melt fastener filler as claimed in claim 1 wherein the core strand is graphite.

3. A hot-melt fastener filler as claimed in claim 1 wherein the at least one ply additionally comprises electrically conductive carbon black particulate within the thermoplastic elastomer.

4. A hot-melt fastener filler as claimed in claim 3 wherein the electrically conductive mat is fabricated of two said plies oriented at 0° and 90° to each other.

5. A hot-melt fastener filler as claimed in claim 3 wherein the particulate is substantially uniformly distributed throughout the thermoplastic elastomer.

6. A hot-melt fastener filler as claimed in claim 5 wherein the electrically conductive mat is fabricated of two said plies oriented at 0° and 90° to each other.

7. A hot-melt fastener as claimed in claim 6 additionally comprising a pressure sensitive adhesive disposed on one side of the mat.

8. A hot-melt fastener filler as claimed in claim 1 wherein each nickel coated fiber is additionally coated with a layer of copper layer followed by a second layer of nickel.

9. A hot-melt fastener filler as claimed in claim 1 wherein the electrically conductive mat is fabricated of two said plies oriented at 0° and 90° to each other.

10. A hot-melt fastener as claimed in claim 1 additionally comprising a pressure sensitive adhesive disposed on one side of the mat.

11. A hot-melt fastener filler for placement within a void atop an in-place fastener which is countersunk within a surface, the fastener filler comprising:

at least one ply sized and configured to be placed within the void atop the in-place countersunk fastener;

a thermoplastic elastomer impregnated within the at least one ply;

a plurality of electrically conductive fibers dispersed within the thermoplastic elastomer; and a heat-conducting patch disposed over the at least one ply, wherein the patch is adapted to contain the elastomer within the void while further being adapted to conduct heat beyond a melting point of the elastomer therethrough to melt the elastomer during cure so as to prevent any of the cured elastomer from protruding outside thereof to thereby form a substantially continuous work surface.

12. The fastener filler of claim 11 wherein the electrically conductive fibers are non-woven fibers.

13. The fastener filler of claim 12 wherein the electrically conductive fibers each comprise a core strand coated with a layer of nickel.

14. The fastener filler of claim 13 wherein the core strand is graphite.

15. The fastener filler of claim 11 wherein the electrically conductive fibers are uniformly dispersed within the thermoplastic elastomer.

16. The fastener filler of claim 11 wherein the thermoplastic elastomer comprises a plurality of electrically conductive carbon black particulate.

* * * * *